United States Patent [19]

Saint-Antonin et al.

[11] Patent Number: 6,050,478
[45] Date of Patent: Apr. 18, 2000

[54] COMPOSITION AND PROCESS FOR THE REACTIVE BRAZING OF CERAMIC MATERIALS CONTAINING ALUMINA

[75] Inventors: François Saint-Antonin, Grenoble; Gérard Bourgeois, Engins, both of France

[73] Assignee: Commissariat A l'Energie Atomique, Paris, France

[21] Appl. No.: 08/889,943

[22] Filed: Jul. 10, 1997

[30] Foreign Application Priority Data

Jul. 23, 1996 [FR] France .................................. 96 09225

[51] Int. Cl.⁷ .............................. B23K 31/02; B23K 1/19; C22C 23/00
[52] U.S. Cl. ................... 228/121; 228/122.1; 228/124.5; 228/262.7; 420/402
[58] Field of Search ................................ 228/121, 122.1, 228/124.1, 124.5, 262.7, 262.72, 262.8, 262.9, 262.51; 420/402

[56] References Cited

U.S. PATENT DOCUMENTS

| 3,122,424 | 2/1964 | King .......................................... 29/195 |
| 4,040,822 | 8/1977 | Stern .......................................... 75/140 |
| 4,599,277 | 7/1986 | Brownlow et al. ...................... 428/552 |
| 4,719,081 | 1/1988 | Mizuhara ................................ 420/463 |
| 4,763,828 | 8/1988 | Fukaya et al. .......................... 228/124 |
| 4,785,827 | 11/1988 | Fischer .................................... 128/783 |
| 5,230,924 | 7/1993 | Li ............................................. 427/229 |

FOREIGN PATENT DOCUMENTS

| 621795 | 2/1963 | Belgium . |
| 2116762 | 10/1972 | Germany ........................ C04B 37/02 |
| 2417478 | 10/1975 | Germany ........................ C03C 27/04 |
| 04270094 | 9/1992 | Japan . |

OTHER PUBLICATIONS

Chemical Abstracts, vol. 118, No. 8, Feb. 22, 1993, Columbus, Ohio US; Abstract No. 65002, Shimizu Takasumi et al.: "Paste Brazes for Metals, Alloys and Ceramics", XP002027336.

Database WPI, Section Ch, Week 8438, Derwent Publications Ltd., London, GB; Class M23, AN 84–234988, XP002028270 & JP 59 141 39A (Mitsui Eng & Shipbuild), Aug. 14, 1984.

Primary Examiner—Patrick Ryan
Assistant Examiner—Kiley Stoner
Attorney, Agent, or Firm—Pearne, Gordon, McCoy & Granger LLP

[57] ABSTRACT

The invention relates to a composition and a process for the reactive brazing of ceramic materials containing alumina. This composition comprises at least one precious metal chosen from among Pd, Pt and Au, as well as magnesium, preferably at the most 5 wt. % magnesium. Brazing takes place at a temperature of 1300 to 1600° C., in the absence of hydrogen.

11 Claims, No Drawings

COMPOSITION AND PROCESS FOR THE REACTIVE BRAZING OF CERAMIC MATERIALS CONTAINING ALUMINA

The present invention relates to a composition and a process for the reactive brazing or hard soldering of ceramic materials containing alumina with themselves or with metals.

It more particularly applies to the production of parts having a complex shape from ceramic elements having a simple shape, which are assembled with other ceramic elements or with metal elements. Such parts must be able to withstand operating temperatures from 500 to 1200° C.

For the production of refractory parts having ceramic elements assembled with other ceramic elements or metal elements, the only possible assembly methods are solid phase diffusion welding and reactive brazing. Thus, assembly methods using an energy beam without brazing solder are unusable, because it is impossible to directly melt a ceramic element without destroying it. In the same way, assemblies by bonding are not suitable, because the adhesives are unable to withstand temperatures exceeding 200° C.

Compared with brazing, solid phase diffusion welding suffers from the disadvantage of being very limitative with regards to the shapes of the parts to be assembled on using uniaxial pressing, or requires numerous operations on using hot isostatic compression (production of the envelope, tight sealing in vacuo, hot isostatic compression and final machining of the envelope). Moreover, this procedure must be avoided during the assembly of a ceramic element with a metal element, because it requires long time periods of 1 to several hours, which can aid the enlargement of the grains in the metal element.

It is known that ceramics containing alumina are not very reactive. In addition, with the exception of active chemical elements such as Ti, Zr and Hf, most transition metal elements such as Ni, Fe, Cu, Mn, Co, Cr, Pt, Au, Ag and Pd do not wet and do not adhere to an alumina surface. It is therefore necessary to use a brazing process, where the melting of an intermediate substance fulfils the essential function. Brazing solders of a glass of a mixed manganese and molybdenum oxide have already been used for this purpose, as described by K. White et al in Materials, Science and Engineering, 75, 1985, pp 207–213.

The brazing process using such brazing solders is relatively complex and onerous to perform, because it involves at least four successive stages of coating alumina with a paste based on molybdenum and manganese, annealing under hydrogen to create the glass, the deposition of a nickel or palladium layer by electrolysis and the actual brazing with a silver base. Moreover, it suffers from the disadvantage of requiring a hydrogen atmosphere during the annealing stage.

Other brazing processes use the reaction of reactive elements such as Ti, Zr and Hf with the alumina surface. This can be brought about by depositing beforehand on the alumina a titanium layer and then carrying out the brazing with a silver base, or by directly using a brazing solder containing the reactive element associated with a matrix such as an Ag—Cu matrix, as described by A. J. Moorhead in the Journal of Material Science, 26, 1991, pp 4067–4075, U.S. Pat. No. 5, 152,449 and JP-A-61/169139.

JP-A-59/141395 describes another ceramic part brazing method, according to which addition takes place to a brazing solder based on silver, copper, nickel, etc., of at least one metal element able to absorb hydrogen. This metal element can be chosen from among Li, Na, K, Be, Mg, Ca, Sr, Ba, Al, Sc, Y, La, Ti, Zr, Hf, V, Nb and Ta. As a result of the presence of said metal element able to absorb hydrogen in the molten state, a porous material is obtained, because the hydrogen is released when the brazing solder solidifies and there is a reduction of the thermal stresses liable to occur at the brazed joint due to the difference between the thermal expansion coefficients of the assembled materials.

The latter process suffers from the disadvantage of requiring the presence of hydrogen during the melting of the brazing solder. It is difficult and dangerous to use hydrogen. However, it is possible to generate hydrogen from air, by the decomposition of the moisture which it contains, but in the latter case, if magnesium is used, the latter will be highly oxidized during this operation.

The present invention is directed at a brazing composition and process using a reactive metal, but not requiring the presence of hydrogen for performing the brazing operation.

According to the invention, the composition of the brazing solder for the brazing of a ceramic material containing alumina with a ceramic material or with a metal, is constituted by magnesium and at least one precious metal chosen from among palladium, platinum, gold and their alloys.

In this composition, the addition of magnesium to a precious metal such as Pd, Pt or Au, makes it possible to increase the wetting of the ceramic material compared with the use of the precious metal alone. Moreover, the magnesium reacts with the alumina of the ceramic material in order to form a layer constituted by alumina and magnesia or compounds of the spinel type. which permit a good engagement between the brazing solder and the ceramic material elements or metal elements to be assembled.

Preferably, this brazing solder composition is formed by an alloy of the precious metal chosen from among Pd, Pt and Au, and magnesium, which contains at the most 5 wt. % magnesium.

As examples of such alloys, reference can be made to alloys of palladium and magnesium containing 2 to 4.5 wt. % Mg.

In order to carry out the brazing of a first ceramic element containing alumina with a second ceramic element or a metal element, between said two elements can be placed a brazing solder composition having the characteristics given hereinbefore and the total composition can be raised to a temperature of 1300 to 1600° C. under a neutral gas atmosphere, e.g. argon.

The brazing temperature is chosen as a function of the magnesium content of the composition, temperatures of 1300 to 1540° C. being appropriate. These temperatures are lower than the melting point of palladium (1555° C.) or platinum (1773° C.), but are above the boiling point of magnesium (1107° C.).

However, despite the use of such high temperatures, there is no significant evaporation of the magnesium during brazing. In addition, although magnesium tends to easily oxidize at such temperatures, such an oxidation is avoided due to the presence of the precious metal such as palladium.

Generally, the brazing solder composition is placed between the two elements in the form of a tinsel foil or sheet of limited thickness, e.g. 20 to 200 μm thick. This tinsel foil or sheet can be produced by melting the precious metal and the magnesium at a temperature of approximately 1540° C., under hydrogen, from the precious metal and magnesium of commercial purity. It is then possible to cold roll the brazing solder in order to obtain a sheet having an appropriate thickness. Thus, with magnesium concentrations below 5 wt. %, the magnesium is in solid solution in the precious metal and the alloy is ductile. In order to prepare a tinsel foil, it is possible to use other methods such as melt-spinning.

It is also possible to use other methods for interposing the brazing solder composition between the elements to be assembled. Thus, said composition can be deposited on the element or elements by methods such as physical vapour deposition (PVD), cathodic sputtering or evaporation.

In order to then melt the brazing solder by raising it to a temperature of 1300 to 1600° C., use can be made of different heating methods, e.g. a laser, an electron beam, induction heating or heating by means of a resistor. The atmosphere used during heating is an inert gas atmosphere, e.g. argon.

Brazing solders based on magnesium and Pd, Pt and/or Au according to the invention are advantageous, because they make it possible to assemble in one operation ceramic elements containing alumina and other ceramic elements containing alumina or metal elements. The ceramic elements containing alumina can e.g. be alumina, pure sapphire, mullite and cordierite. The metals can be platinum, refractory metals such as Mo, Nb, Ta, Zr, Ti and W and alloys based on refractory metals.

Assembly can take place at temperatures above 1300° C., so that resistant assemblies can be obtained up to 1150° C. In addition, such assemblies are able to resist oxidizing atmospheres, because the presence of magnesium induces the formation of a passivating layer. Moreover, the brazing solder remains ductile following the brazing operation and can consequently absorb the residual stresses, which can e.g. be generated by thermal cycles.

The process according to the invention is more particularly applicable to the production of industrial, complex shaped ceramic parts, which are difficult to manufacture, but which can be produced from ceramic elements having a simple shape by ceramic-ceramic and ceramic-metal assembly. Such parts can be components for high temperature applications, e.g.:

position sensors making it possible to measure the spacing between fixed and mobile parts of aircraft engines, igniters for combustion chambers of aircraft engines and ceramic heat exchangers for very high temperature applications.

The production of such components generally requires the assembly of alumina with alumina, platinum or palladium.

Other features and advantages of the invention can be gathered from studying the following illustrative, non-limitative examples.

EXAMPLE 1
Assembly of two alumina elements

In order to carry out this assembly, use is made of a palladium strip containing 2 wt. % magnesium and having a thickness of 100 to 200 µm.

This strip is prepared by melting at 1540° C., under an atmosphere containing hydrogen, of the desired quantities of palladium and magnesium of commercial purity. The alloy obtained then undergoes rolling in order to form a 100 to 200 µm thick strip, which is then cut to the dimensions of the elements to be assembled. This strip is placed between the two alumina elements, which have been previously cleaned and a weight is placed on the assembly in order to ensure a good contact. This is followed by the introduction of the assembly into a furnace where a brazing cycle takes place under an argon atmosphere in the following way.

The assembly is firstly raised to a temperature of 300° C. for one hour and it is then brought to the brazing temperature of 1540° C. This temperature is maintained for 10 minutes under an argon pressure of 0.1 MPa. This leads to a resistant assembly. Thus, when a mechanical shear test was performed on the alumina-brazing solder-alumina bond, breaking occurred at 160 MPa.

EXAMPLE 2
Assembly of two alumina elements

In this example, the operating procedure of example 1 is followed, except that use is made of a palladium strip containing 3 wt. % magnesium and brazing is performed at a temperature of 1520° C., said temperature being maintained for 10 minutes.

The mechanical shear test leads to the breaking of the alumina-brazing solder-alumina bond at 72 MPa.

EXAMPLE 3
Assembly of two alumina elements

In this example the operating procedure of example 1 is followed, except that use is made of a palladium strip containing 4.5 wt. % magnesium and brazing is performed at a temperature of 1500° C. for 10 minutes.

The mechanical shear test led to the breaking of the alumina-brazing solder-alumina bond at 170 MPa.

In addition, testing took place of the oxidation resistance of the assemblies obtained in examples 1, 2 and 3, by keeping them in air for 12 hours at 1150° C., followed by natural cooling outside the furnace. Under these conditions, none of the assemblies revealed any sign of deterioration.

EXAMPLE 4
Assembly of an alumina element and a platinum element

The operating procedure of example 1 was followed, except that use was made of a palladium strip containing 3% magnesium, which was placed between the alumina element and the platinum element, both of which had been previously cleaned. This was followed by brazing following a plateau at a temperature of 300° C. for 1 hour under the following conditions:

brazing temperature: 1520° C.,
plateau time: 10 minutes,
argon pressure: 0.1 MPa.

A mechanical shear test performed on this assembly led to the breaking of the alumina-brazing solder-platinum bond at 154 MPa.

Thus, the assemblies obtained according to the invention have a satisfactory breaking strength and oxidation resistance, which make them interesting for numerous applications.

What is claimed is:

1. A process for brazing a first ceramic element containing alumina with a second ceramic element or a metal element, comprising the steps of disposing between the two elements a brazing solder composition that is a precious metal alloy consisting essentially of magnesium and at least one precious metal chosen from the group consisting of palladium, platinum, gold and their alloys to form an assembly, said precious metal alloy containing at most 5% magnesium by weight, and heating the assembly to a temperature of 1300 to 1600° C. under a neutral gas atmosphere.

2. A process according to claim 1, wherein the composition is in the form of a sheet with a thickness of 20 to 200 µm.

3. A process according to claim 1, wherein the first and second elements are of alumina.

4. A process according to claim 1, wherein the second element is of refractory metal, platinum or refractory alloy.

5. A process according to claim 2, wherein the first and second elements are of alumina.

6. A process according to claim 2, wherein the second element is of refractory metal, platinum or refractory alloy.

7. A process according to claim 4, wherein the first element is of alumina and the second element of platinum.

8. A process according to claim 6, wherein the first element is of alumina and the second element is of platinum.

9. A process according to claim 1, wherein said precious metal alloy is an alloy of palladium and magnesium containing 2 to 4.5 wt. % Mg.

10. A process according to claim 1, wherein said heating step brazes said first ceramic element to said second ceramic element or metal element and forms a brazed assembly of said elements.

11. A process according to claim 1, wherein the step of disposing said brazing solder between the elements includes the step of forming a thin strip of said brazing solder composition for disposition between the two elements.

* * * * *